(12) United States Patent
Chang et al.

(10) Patent No.: US 8,249,304 B2
(45) Date of Patent: Aug. 21, 2012

(54) SYSTEM AND METHOD FOR MEASURING GAPS BETWEEN OBJECT PARTS

(75) Inventors: Chih-Kuang Chang, Taipei Hsien (TW); Xin-Yuan Wu, Shenzhen (CN); Shao-Qin Xie, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 509 days.

(21) Appl. No.: 12/556,777

(22) Filed: Sep. 10, 2009

(65) Prior Publication Data

US 2010/0226540 A1    Sep. 9, 2010

(30) Foreign Application Priority Data

Mar. 3, 2009  (CN) .......................... 2009 1 0300656

(51) Int. Cl.
*G06K 9/00* (2006.01)
*G06K 9/62* (2006.01)
(52) U.S. Cl. ........................................ 382/106; 382/156

(58) Field of Classification Search .................. 382/106, 382/154, 291; 702/167
See application file for complete search history.

(56) References Cited

U.S. PATENT DOCUMENTS

| | | | |
|---|---|---|---|
| 6,738,727 B2 * | 5/2004 | Chang ........................... | 702/167 |
| 2005/0018901 A1 * | 1/2005 | Kaufmann et al. ........... | 382/154 |

\* cited by examiner

*Primary Examiner* — Anand Bhatnagar
*Assistant Examiner* — Amara Abdi
(74) *Attorney, Agent, or Firm* — Altis Law Group, Inc.

(57) ABSTRACT

A detecting method for measuring gaps between two parts of an object is provided. The detecting method selects a reference image and a measured image, merges the reference image and the measured image to form an image of the object, grids the reference image and the measured image to obtain triangle mesh surfaces, obtains boundary points and outline points of the measured image, and obtains triangles on a joint portion of the reference image and measured points on a corresponding joint portion of the measured image. The method further compares each measured point with an obtained triangle to obtain gap values of the joint portion between the reference image and the measured image, and outputs an analysis report of the gap values on a display device.

20 Claims, 10 Drawing Sheets

SYSTEM AND METHOD FOR MEASURING GAPS BETWEEN OBJECT PARTS

BACKGROUND

1. Technical Field

Embodiments of the present disclosure relate to systems and methods for measuring objects, and particularly to a system and method for measuring gaps between object parts.

2. Description of Related Art

Measurement is an important phase in the manufacturing process and is closely interrelated to product quality. In recent years, image measuring machines have been used to obtain a point cloud of an object by scanning a large number of points on a surface of the object, processing the point cloud, and subsequently extracting boundary elements including boundary points and boundary characteristics of the object, in order to form a profile image of the object.

The quality of the whole object may be determined by checking whether a profile image and an actual image of the object can be aligned. However, the method cannot provide measurement of gaps between where two parts of an object join, especially for irregular parts with unique positions.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
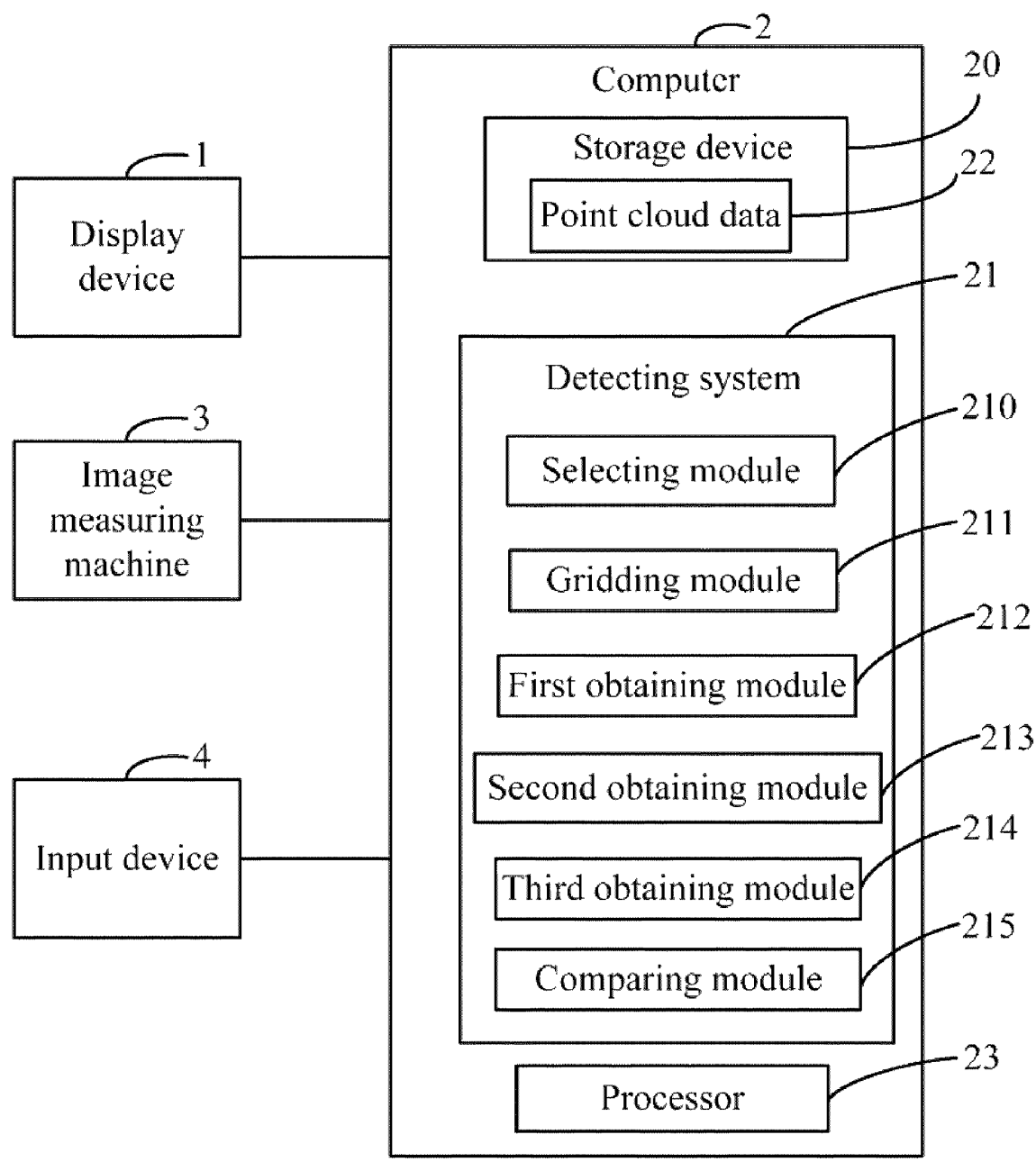
FIG. 1 is a block diagram of one embodiment of a computer comprising a system for measuring gaps between two parts of an object.

FIG. 1 is a block diagram of one embodiment of a computer 2 comprising a detecting system 21. The detecting system 21 may be used to measure gaps between two parts of an object by selecting two images of the two parts, merging the two selected images to form a single image of the object, and calculating the gap values of a joint portion in the image of the object, where the gap values of the joint portion in the image of the object are regarded as the gap values of the joint portion between the two parts of the object. In one embodiment, one of the two selected images is regarded as a reference image, and the other one is regarded as a measured image. A detailed description will be given in the following paragraphs.

In one embodiment, the computer 2 is electronically connected to a display device 1, an image measuring machine 3, and an input device 4. Depending on the embodiment, the display device 1 may be a liquid crystal display (LCD) or a cathode ray tube (CRT) display, for example. A schematic diagram of one embodiment of the image measuring machine 3 is shown in FIG. 2.

In one embodiment, the image measuring machine 3 includes a top cover 31, a CCD lens 32, a platform 33, and a holder 34. An object 35 (e.g., a chipset on a motherboard) to be measured is positioned on the platform 33. It should be noted that the image measuring machine 3 as disclosed and illustrated in FIG. 2 is exemplary and can further include other components that will be explained further herein, such as an X-axis motor along the X axis, a Y-axis motor along the Y axis, and a Z-axis motor along the Z axis.

The computer 2 further includes a storage device 20 for storing information, such as point cloud data 22. In one embodiment, the point cloud data 22 may include coordinates of each point, an identification (ID) of each point, and a total number of points in the point cloud.

Figure 2:
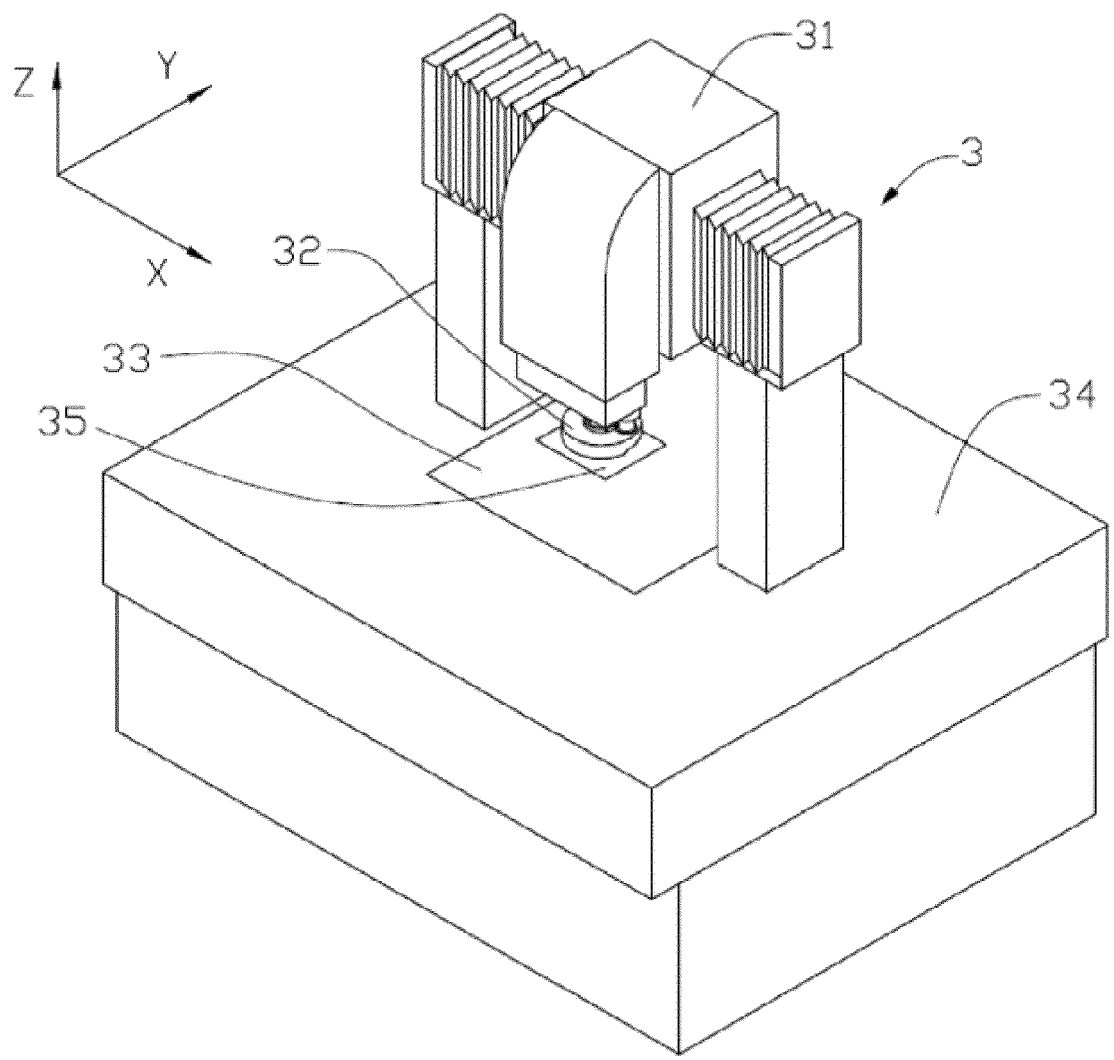
FIG. 2 is a schematic diagram of one embodiment of an image measuring machine.

The input device 4 provides direct control of the motion of one or more components (e.g., the CCD lens 32) of the image measuring machine 3, e.g., along the X-axis, the Y-axis, and/or the Z-axis (refer to X-Y-Z coordinates shown in FIG. 2). In one embodiment, the input device 4 may be a lever for adjusting position of the CCD lens 32 of the image measuring machine 3.

In one embodiment, the detecting system 21 includes a selecting module 210, a gridding module 211, a first obtaining module 212, a second obtaining module 213, a third obtaining module 214, and a comparing module 215. In one embodiment, the modules 210-215 comprise one or more computerized instructions that are stored in the storage device 20. A processor 23 of the computer 2 executes the computerized instructions to implement one or more operations of the computer 2.

Figure 3:
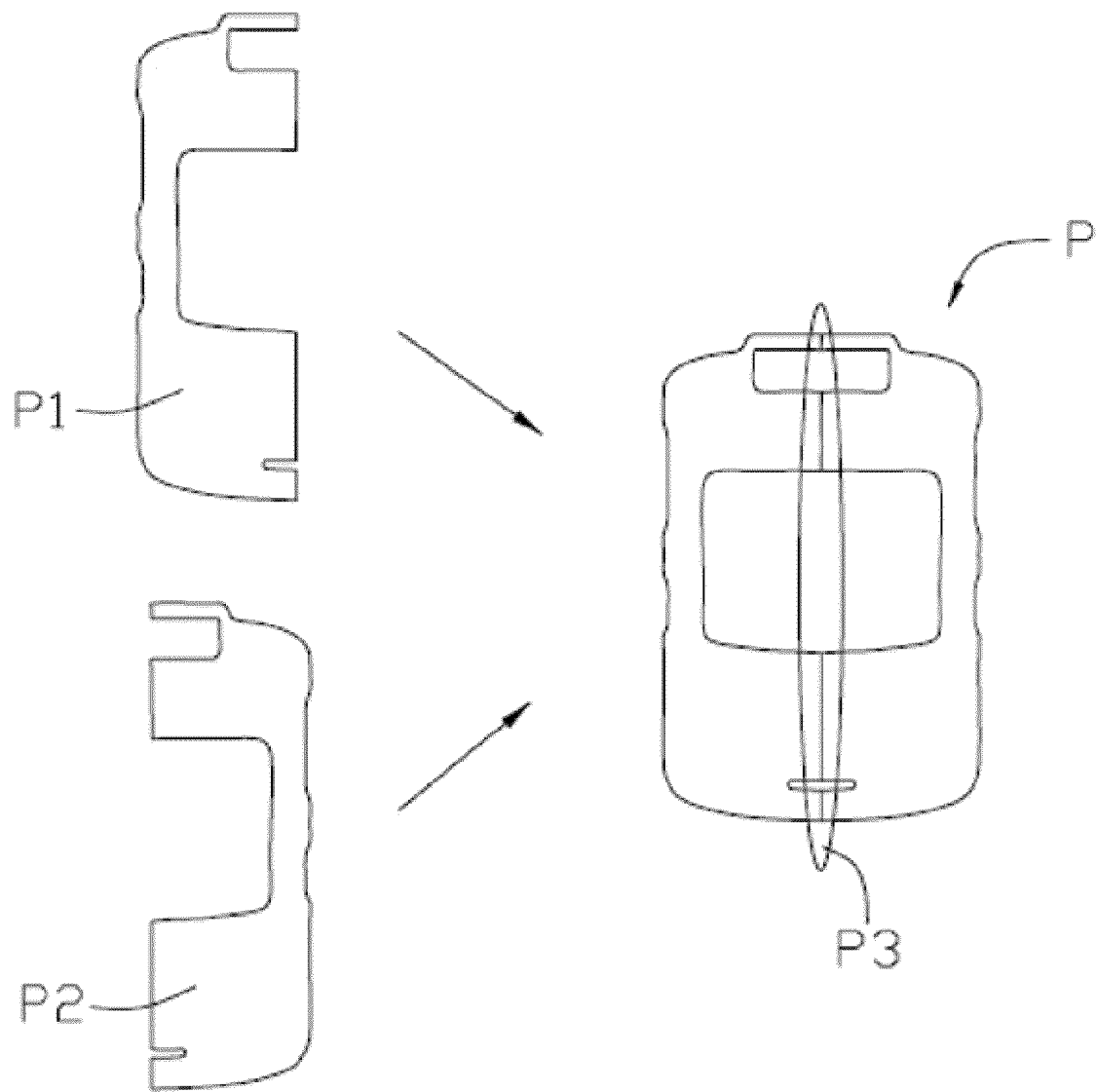
FIG. 3 is a schematic diagram of one embodiment of a gap between two parts of an object.

The selecting module 210 selects two images of two parts that are jointed in the object 35, and merges the two images to form an image of the object 35. In one embodiment, one of the two images is regarded as a reference image, and the other image is regarded as a measured image. As shown in FIG. 3, supposing P1 represents the reference image, P2 represents the measured image, and P represents a resulting image of the object 35 gained by merging P1 and P2. In one embodiment, the object 35 is formed by joining the two parts in P1 and P2, P3 represents a gap of a joint portion of between the two parts in the image P. In other embodiments, the number of parts in the object 35 may exceed two.

The gridding module 211 grids the reference image and the measured image to obtain triangle mesh surfaces of the reference image and the measured image. A detailed description refer to FIG. 5.

The first obtaining module 212 obtains boundary points of the measured image. A detailed description refer to FIG. 6.

The second obtaining module 213 obtains outline points of the measured image. A detailed description refer to FIG. 7.

The third obtaining module 214 obtains triangles on a joint portion of the reference image and measured points on a corresponding joint portion of the measured image based on the boundary points and the outline points of the measured image. A detailed description refer to FIG. 8.

The comparing module 215 compares each measured point with an obtained triangle to obtain gap values of the joint portion between the reference image and the measured image, where the gap values of the joint portion between the reference image and the measured image are regarded as the gap values of the joint portion between the two parts of the object 35. A detailed description refer to FIG. 10.

The comparing module 215 further outputs an analysis report of the gap values on the display device 1.

Figure 4:
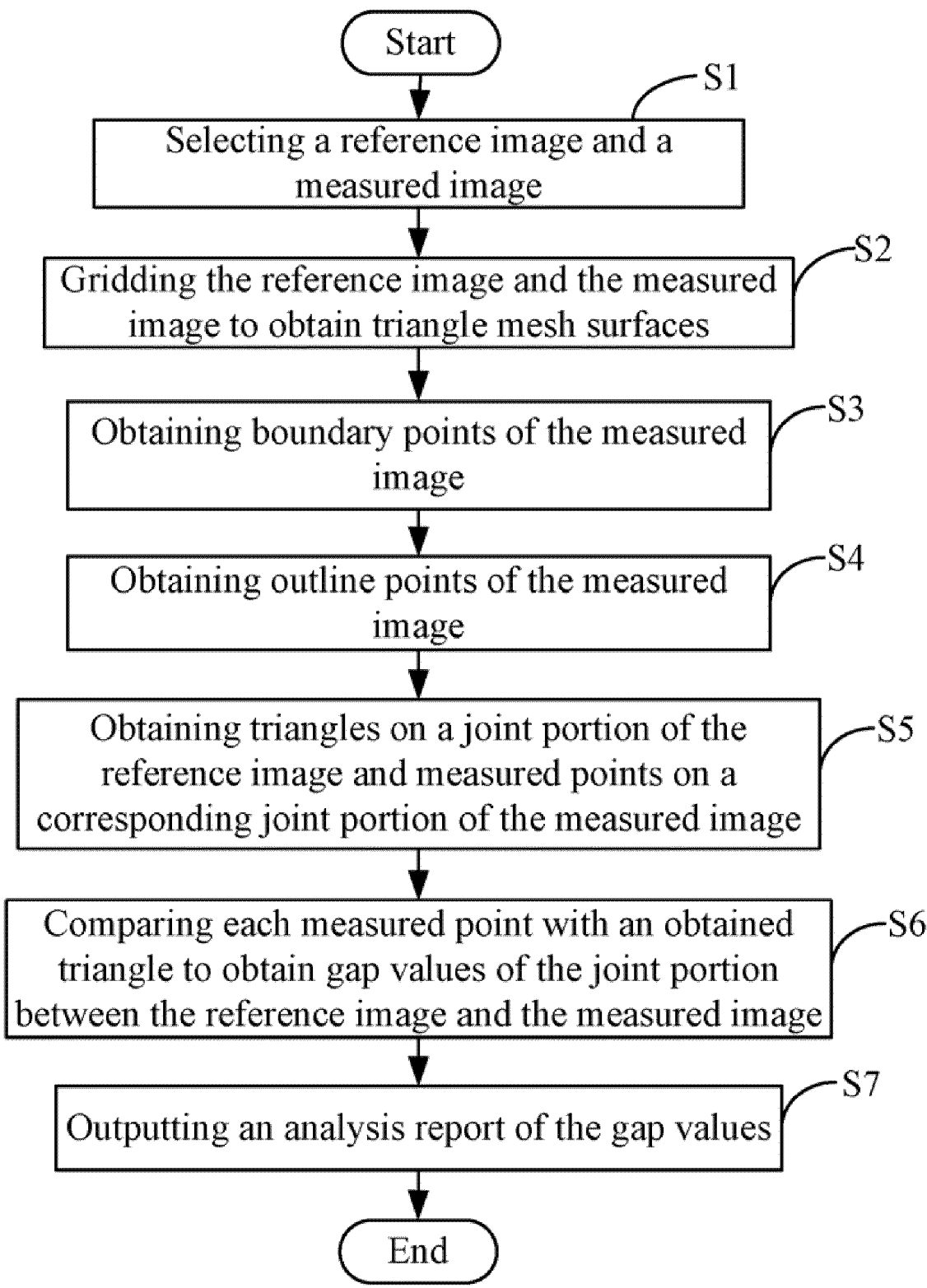
FIG. 4 is a flowchart of one embodiment of a method for measuring gaps between two parts of an object.

FIG. 4 is a flowchart of one embodiment of a method for measuring gaps between two parts of an object. Depending on the embodiment, additional blocks may be added, others removed, and the ordering of the blocks may be changed.

In block S1, the selecting module 210 selects two images of two parts that are jointed in the object 35, and merges the two images to form an image of the object 35. In one embodiment, one of the two images is regarded as a reference image, and the other image is regarded as a measured image.

In block S2, the gridding module 211 grids the reference image and the measured image to obtain triangle mesh surfaces of the reference image and the measured image. A detailed description refer to FIG. 5.

In block S3, the first obtaining module 212 obtains boundary points of the measured image. A detailed description refer to FIG. 6.

In block S4, the second obtaining module 213 obtains outline points of the measured image. A detailed description refer to FIG. 7.

In block S5, the third obtaining module 214 obtains triangles on a joint portion of the reference image and measured points on a corresponding joint portion of the measured image based on the boundary points and the outline points of the measured image. A detailed description refer to FIG. 8.

In block S6, the comparing module 215 compares each measured point with an obtained triangle to obtain gap values of the joint portion between the reference image and the measured image, where the gap values of the joint portion between the reference image and the measured image are regarded as the gap values of the joint portion between the two parts of the object 35. A detailed description refer to FIG. 10.

In block S7, the comparing module 215 outputs an analysis report of the gap values on the display device 1.

Figure 5:
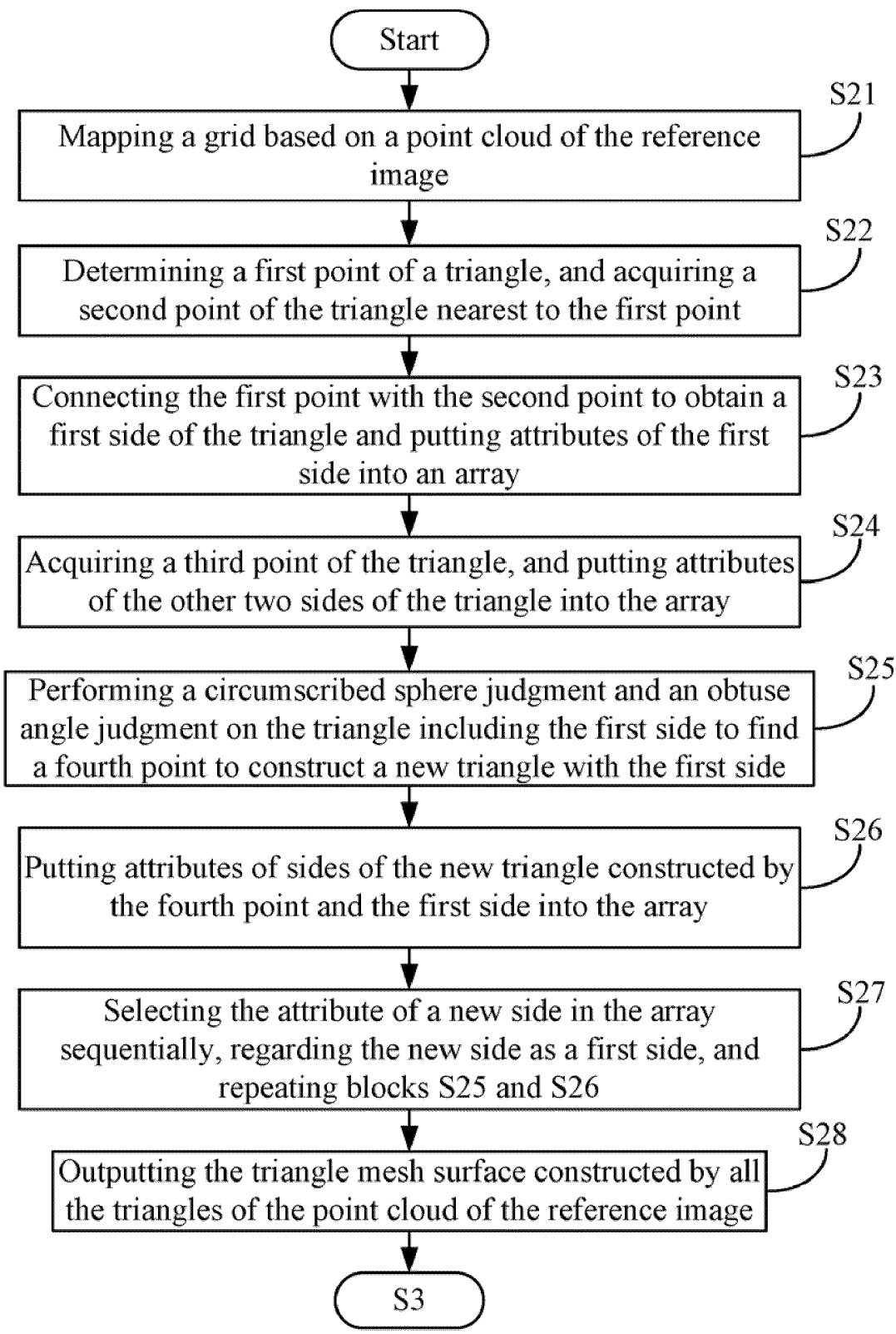
FIG. 5 is a detailed flowchart of one embodiment of gridding a reference image in FIG. 4.

FIG. 5 is a detailed flowchart of one embodiment of gridding the reference image in FIG. 4. A detailed procedure of gridding the measured image is similar to the procedure of gridding the reference image. Depending on the embodiment, additional blocks may be added, others removed, and the ordering of the blocks may be changed.

In block S21, the gridding module 211 maps a grid based on the point cloud of the reference image. In detail, the gridding module 211 determines a cubical figure that confines a point cloud of the reference image, maps a grid on the cubical figure to obtain a plurality of grid squares, and puts an identification (ID) of each point of the point cloud into a corresponding grid square.

In block S22, the gridding module 211 determine a first point of a triangle in the point cloud, obtains grid squares surrounding the first point, and acquires a second point of the triangle nearest to the first point in the grid squares surrounding the first point.

In block S23, the gridding module 211 connects the first point with the second point to obtain a first side of the triangle, and puts attributes of the first side into an array. In one embodiment, the attributes include coordinate values of two endpoints of the first side, and a length of the first side.

In block S24, the gridding module 211 acquires a third point of the triangle according to a preset maximum side length, constructs the triangle utilizing the first point, the second point and the third point, and puts attributes of the other two sides of the triangle into the array.

In block S25, the gridding module 211 performs a circumscribed sphere judgment and an obtuse angle judgment on the triangle including the first side to find a fourth point to construct a new triangle with the first side. An example of the obtuse angle judgment is as follows.

During the obtuse angle judgment, an angle that is equal to 120° should be first considered. If the gridding module 211 finds more than one point after the circumscribed sphere judgment and obtuse angle judgment, the gridding module 211 needs to determine one point as the fourth point D'. For example, when the gridding module 211 finds two points D1' and D2', if the point D1' and the first side B0 are used to construct a triangle T1', and the point D2' and the first side B0 are used to construct a triangle T2', the gridding module 211 needs to judge which opposite angle of the first side B0 in the two triangles T1' and T2' is larger. If the opposite angle of the first side B0 in the triangle T1' is larger than that in the triangle T2', the gridding module 211 determines that the point D1' is the fourth point D' finally found by the module 211. Otherwise, if the opposite angle of the first side B0 in the triangle T2' is larger than that in the triangle T1', the gridding module 211 determines that the point D2' is the fourth point D' finally found by the module 211.

In block S26, the gridding module 211 puts attributes of sides of the new triangle constructed by the fourth point and the first side into the array.

In block S27, the gridding module 211 selects the attribute of a new side in the array sequentially, regarding the new side as a first side, and repeating the blocks S25 and S26.

In block S28, the gridding module 211 outputs the triangle mesh surface constructed by all the triangles of the point cloud of the reference image if the attributes of each side in the array have been selected.

Figure 6:
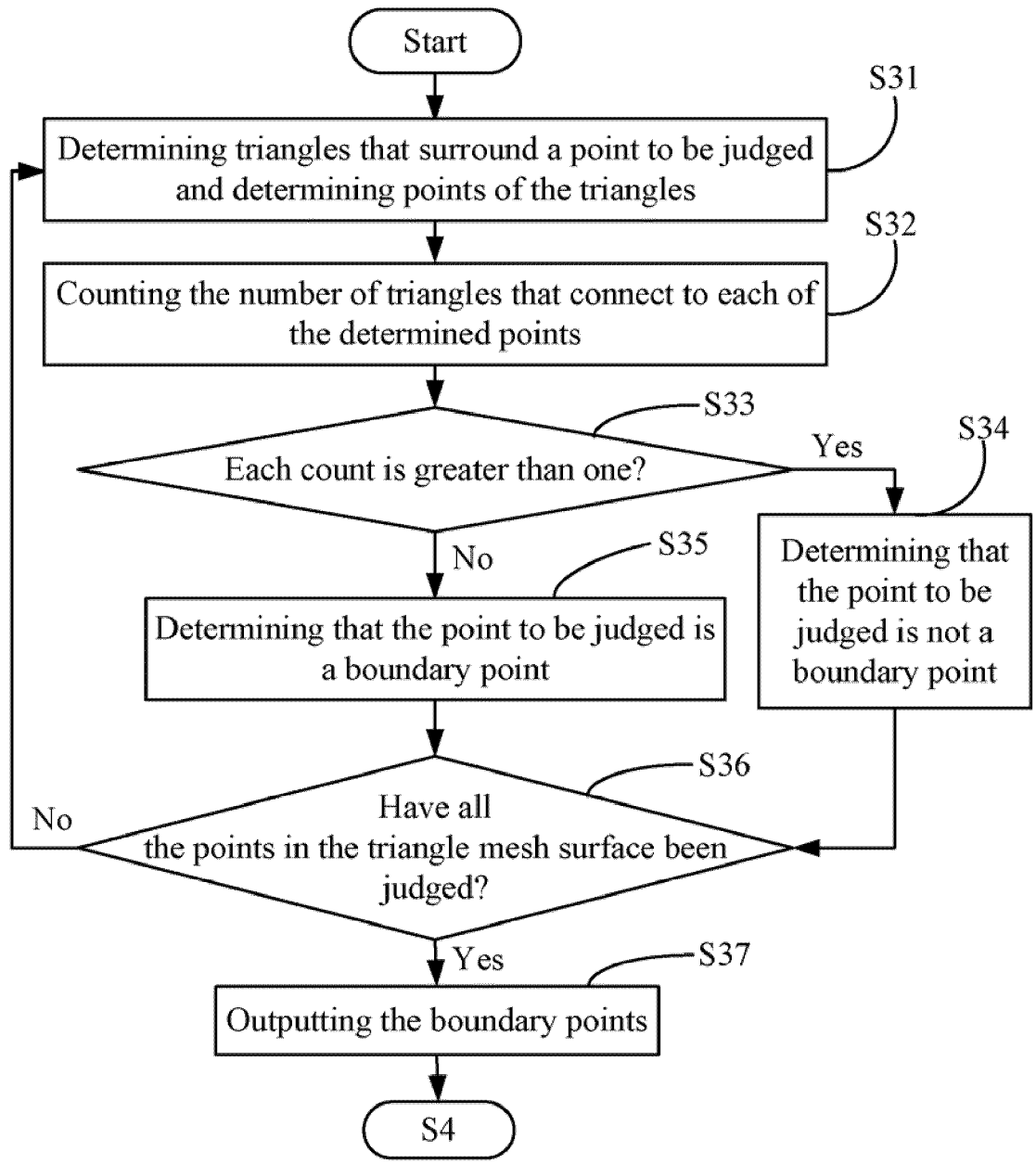
FIG. 6 is a detailed flowchart of one embodiment of block S3 in FIG. 4.

FIG. 6 is a detailed flowchart of one embodiment of block S3 in FIG. 4.

In block S31, the first obtaining module 212 determines triangles that surround a point to be judged and determining points of the triangles.

In block S32, the module 212 counts the number of triangles that connect to each of the determined points.

In block S33, the module 212 determines if each count is greater than one, and the procedure goes to block S34 if each count is greater than one, or the procedure goes to block S35 if any count is less than or equal to one.

In block S34, the module 212 determines that the point to be judged is not a boundary point of the measured image, then block S36 is implemented.

In block S35, the module 212 determines that the point to be judged is the boundary point of the measured image, then block S36 is implemented.

In block S36, the module 212 determines if all the points in the triangle mesh surface of the measured image have been judged. The procedure goes to block S37 if all the points have been judged, otherwise, the procedure returns to block S31 if any point has not been judged.

In block S37, the module 212 outputs the boundary points.

Figure 7:
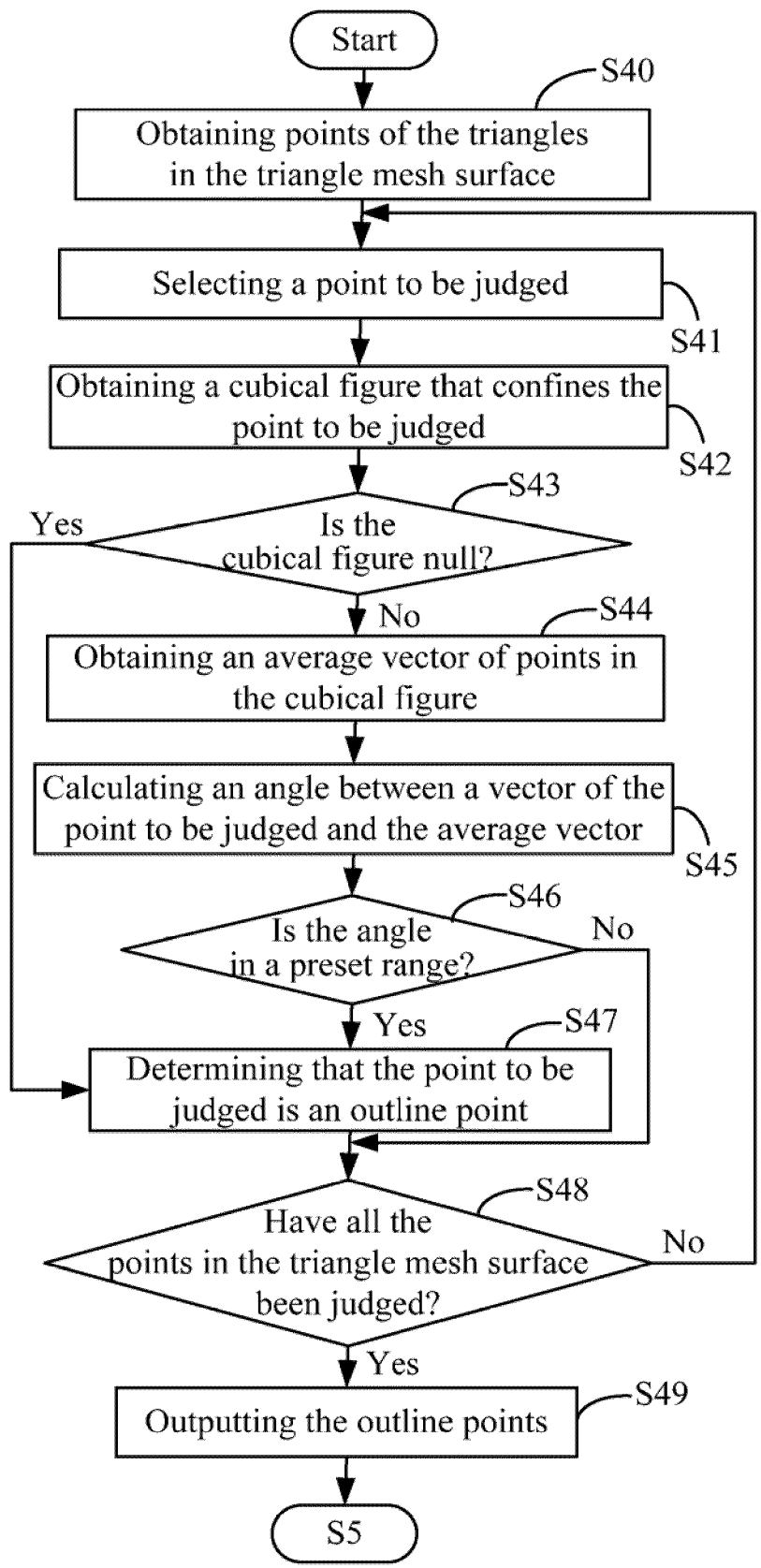
FIG. 7 is a detailed flowchart of one embodiment of block S4 in FIG. 4.

FIG. 7 is a detailed flowchart of one embodiment of block S4 in FIG. 4. Depending on the embodiment, additional blocks may be added, others removed, and the ordering of the blocks may be changed.

In block S40, the second obtaining module 213 obtains points of the triangles in the triangle mesh surface of the measured image.

In block S41, the module 213 selects a point to be judged of the triangles in the triangle mesh surface.

In block S42, the module 213 obtains a cubical figure that confines the point to be judged.

In block S43, the module 213 determines if the cubical figure is null. The procedure goes to block S44 if the cubical figure is not null, or the procedure goes to block S47 if the cubical figure is null.

In block S44, the module 213 obtains an average vector of points in the cubical figure.

In block S45, the module 213 calculates an angle between a vector of the point to be judged and the average vector.

In block S46, the module 213 determines if the angle is in a preset range. The procedure goes to block S47 if the angle is in the preset range, or the procedure goes to block S48 if the angle is not in the preset range. In one embodiment, the preset range may be between 1 and 90°.

In block S47, the module 213 determines that the point to be judged is an outline point, and block S48 is implemented.

In block S48, the module 213 determines if all the points in the triangle mesh surface have been judged. The procedure goes to block S41 if any of the points has not been judged, or the procedure goes to block S49 if all the points have been judged.

In block S49, the module 213 outputs the outline points.

Figure 8:
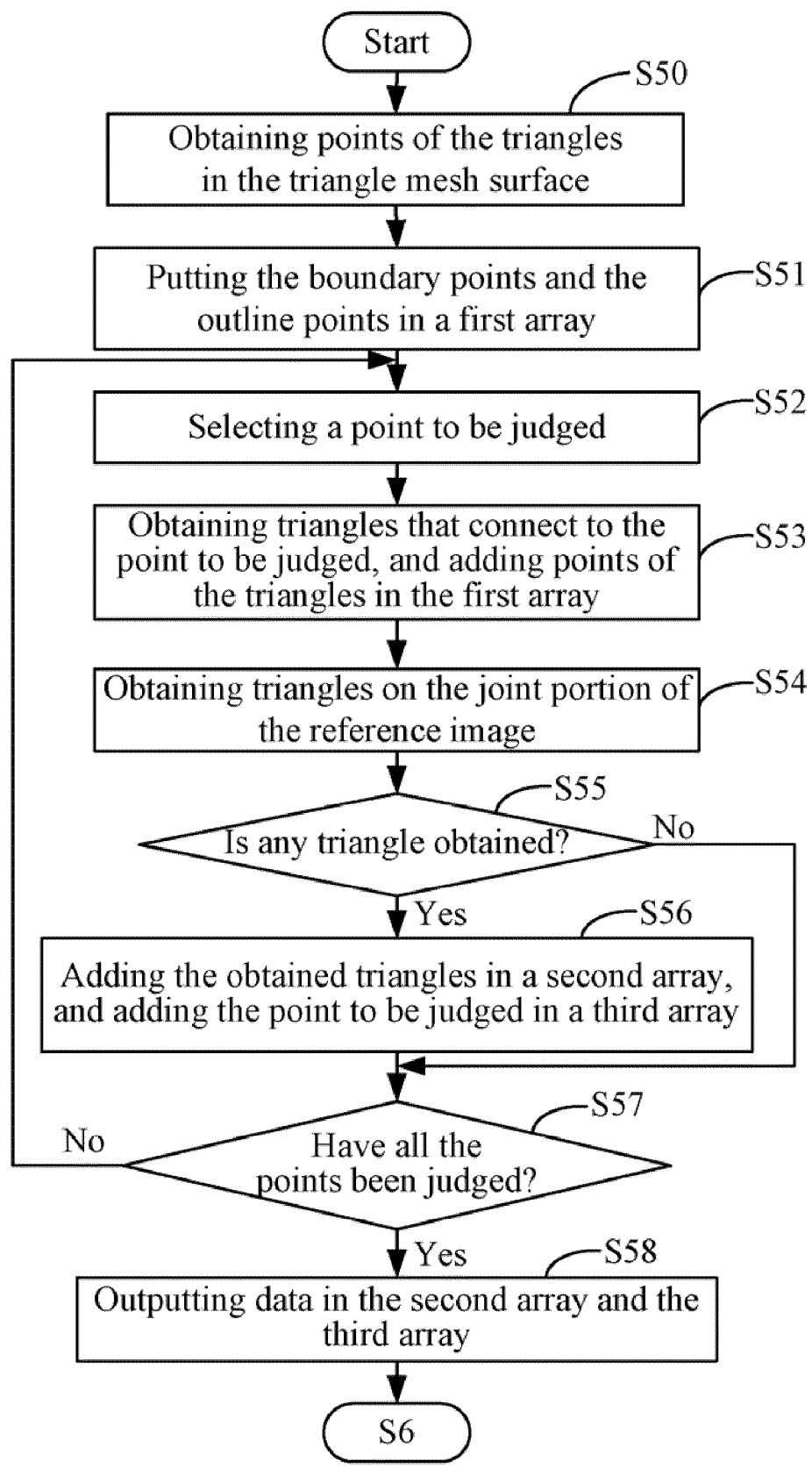
FIG. 8 is a detailed flowchart of one embodiment of block S5 in FIG. 4.

FIG. 8 is a detailed flowchart of one embodiment of block S5 in FIG. 4. Depending on the embodiment, additional blocks may be added, others removed, and the ordering of the blocks may be changed.

In block S50, the third obtaining module 214 obtains points of the triangles in the triangle mesh surface of the reference image.

In block S51, the third module 214 puts the boundary points and the outline points of the measured image in a first array.

In block S52, the third module 214 selects a point to be judged from the first array sequentially.

In block S53, the third module 214 obtains triangles that connect to the point to be judged, and adds points of the triangles in the first array.

In block S54, the third module 214 obtains triangles on the joint portion of the reference image. In one embodiment, a width of the joint portion of the reference image is a preset number, such as 0.3 millimeters.

In block S55, the third module 214 determines if a triangle on the joint portion is obtained in block S54. The procedure goes to block S56 if a triangle on the joint portion is obtained in block S54, or the procedure goes to block S57 if no triangle on the joint portion is obtained in block S54;

In block S56, the third module 214 adds the obtained triangles in a second array, and adds the point to be judged in a third array.

In block S57, the third module 214 determines if all the points in the first array have been judged. The procedure goes to block S52 if any of the points in the first array has not been judged, or the procedure goes to block S58 if all the points in the first array have been judged.

In block S58, the third module 214 outputs data in the second array and the third array. In one embodiment, the obtained triangles stored in the second array are regarded as the triangles on the joint portion of the reference image, and the points stored in the third array are regarded as the measured points on the corresponding joint portion of the measured image.

Figure 9:
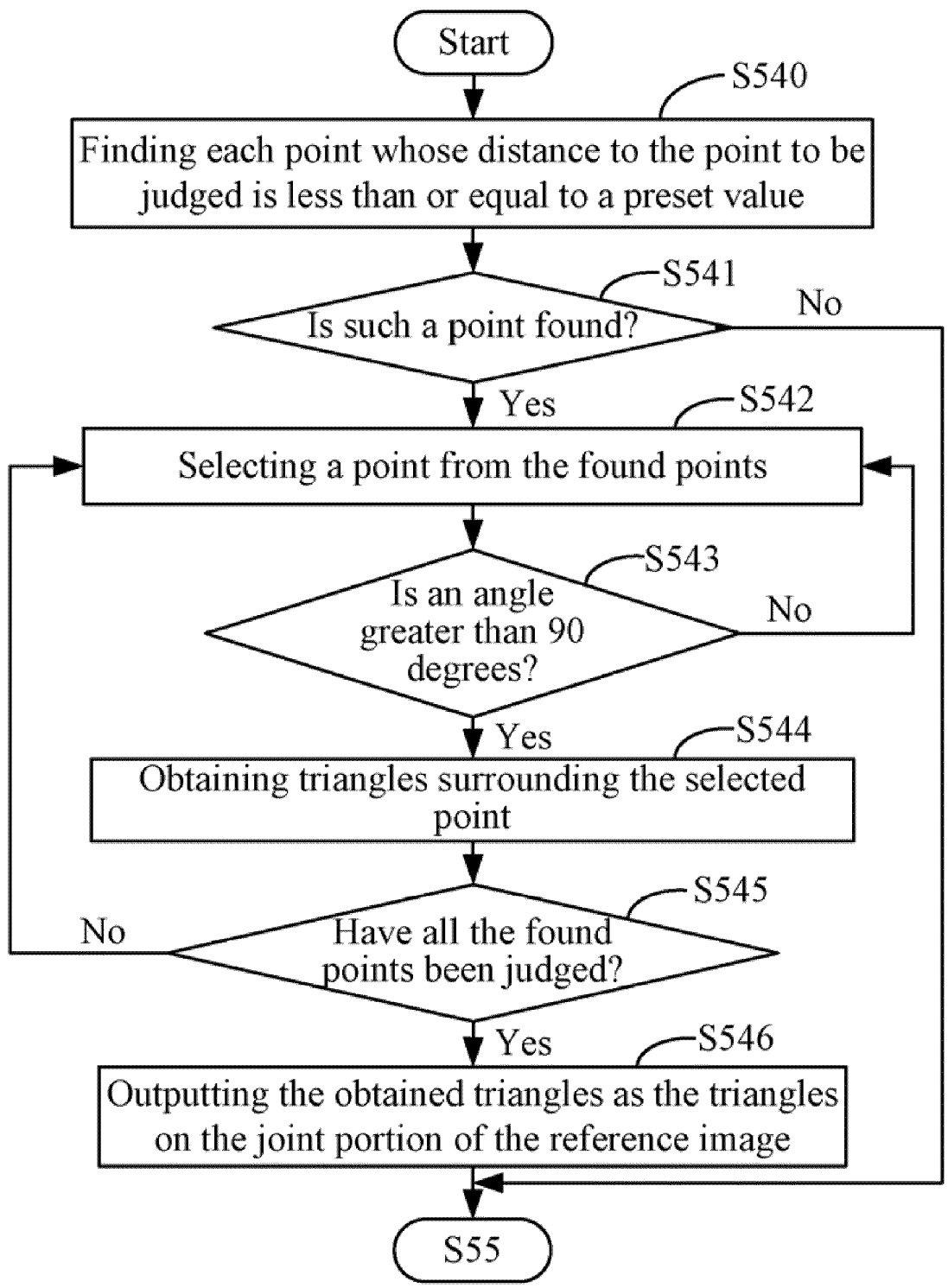
FIG. 9 is a detailed flowchart of one embodiment of block S54 in FIG. 8.

FIG. 9 is a detailed flowchart of one embodiment of block S54 in FIG. 8. Depending on the embodiment, additional blocks may be added, others removed, and the ordering of the blocks may be changed.

In block S540, the third obtaining module 214 finds each point whose distance to the point to be judged is less than or equal to a preset value.

In block S541, the module 214 determines if such a point is found. The procedure goes to block S55 if no point is found, or the procedure goes to block S542 if such a point is found.

In block S542, the module 214 selects a point from the found points.

In block S543, the module 214 determines if an angle between a vector of the selected point and a vector of the point to be judged is greater than 90 degrees. The procedure goes to block S544 if the angle is greater than 90 degrees, or the procedure goes to block S542 if the angle is less than or equal to 90 degrees.

In block S544, the module 214 obtains triangles surrounding the selected point, where the obtained triangles are regarded as the triangles on the joint portion of the reference image.

In block S545, the module 214 determines if all the found points in block S540 have been judged. The procedure goes to block S546 if all the found points have been judged, or the procedure returns to block S542 if any of the found points has not been judged.

In block S546, the module 214 outputs the obtained triangles in block S544, where the obtained triangles are regarded as the triangles on the joint portion of the reference image.

Figure 10:
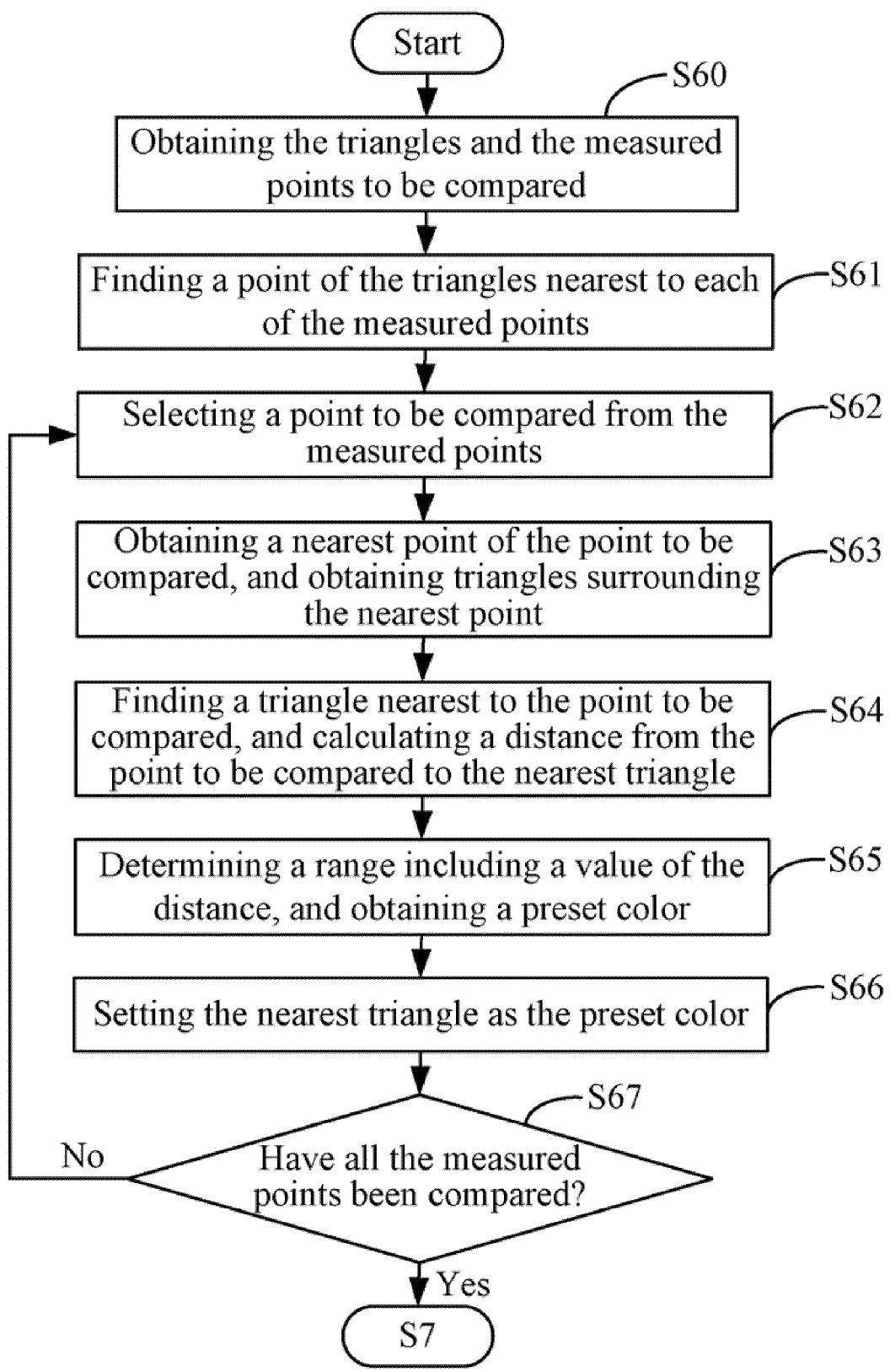
FIG. 10 is a detailed flowchart of one embodiment of block S6 in FIG. 4.

FIG. 10 is a detailed flowchart of one embodiment of block S6 in FIG. 4. Depending on the embodiment, additional blocks may be added, others removed, and the ordering of the blocks may be changed.

In block S60, the comparing module 215 obtains the triangles and the measured points to be compared.

In block S61, the module 215 finds a point of the triangles nearest to each of the measured points.

In block S62, the module 215 selects a point to be compared from the measured points.

In block S63, the module 215 obtains a nearest point of the point to be compared, and obtains triangles surrounding the nearest point.

In block S64, the module 215 finds a triangle nearest to the point to be compared from the surrounding triangles in block S63, and calculates a distance from the point to be compared to the nearest triangle. In one embodiment, the distance is regarded as one of the gap values of the joint portion of the reference image and the measured image. A detailed description of calculating a distance from the point to be compared to the nearest triangle includes: if a projection of the point to be compared is positioned inside the nearest triangle, the distance from the point to be compared to the nearest triangle equals a distance between the projection and the point to be compared; or if the projection of the point to be compared is positioned outside the nearest triangle, the distance from the point to be compared to the nearest triangle equals a minimum distance from the point to be compared to the three sides of the nearest triangle.

In block S65, the module 215 determines a range including a value of the distance, and obtains a preset color of the range. In one embodiment, three ranges are pre-established, such as a first range [0, 0.050), a second range [0.050, 0.100), and a third range [0.100, +∞). Supposing a preset color of the first range is green, a preset color of the second range is yellow, and a preset color of the third range is red. In one embodiment, if the value of the distance is positioned in the first range, the module 215 determines that the gap value between the reference image and the measured image is acceptable, if the value of the distance is positioned in the third range, the module 215 determines that the gap value between the reference image and the measured image is unacceptable.

In block S66, the module 215 sets the nearest triangle as the preset color. If the value of the distance is positioned in the first range, the nearest triangle is set as a green color, if the value of the distance is positioned in the second range, the nearest triangle is set as a yellow color, or if the value of the distance is positioned in the third range, the nearest triangle is set as a red color. Thus, acceptability of measurement (i.e., the gap values) of the joint portion between the two parts can be determined by the color of the joint portion between the reference image and the measured image on a graphical user interface (GUI), such as the display device 1. In other words, if the color of a part of the joint portion is red, the measurement of the part of the joint portion is unacceptable.

In block S67, the module 215 determines if all the measured points have been compared. The procedure goes to block S7 if all the measured points have been compared, or the procedure returns to block S62 if any of the measure points has not been compared.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for measuring gaps between two parts of an object, the method comprising:
    (a) selecting two images of the two parts that are jointed in the object, and merging the two images to form an image of the object, wherein one of the two images is regarded as a reference image, and the other image is regarded as a measured image;
    (b) gridding the reference image and the measured image to obtain triangle mesh surfaces of the reference image and the measured image;
    (c) obtaining boundary points of the measured image;
    (d) obtaining outline points of the measured image;
    (e) obtaining triangles on a joint portion of the reference image and measured points on a corresponding joint portion of the measured image based on the boundary points and the outline points of the measured image;
    (f) comparing each measured point with an obtained triangle to obtain gap values of the joint portion between the reference image and the measured image, wherein the gap values of the joint portion between the reference image and the measured image are regarded as the gap values of the joint portion between the two parts of the object; and
    (g) outputting an analysis report of the gap values on a display device.

2. The method according to claim 1, wherein gridding the reference image comprises:
    (b1) determining a cubical figure that confines a point cloud of the reference image, mapping a grid on the cubical figure to obtain a plurality of grid squares, and putting an identification (ID) of each point of the point cloud into a corresponding grid square;
    (b2) determining a first point of a triangle in the point cloud, obtaining grid squares surrounding the first point, and acquiring a second point of the triangle nearest to the first point in the grid squares surrounding the first point;
    (b3) connecting the first point with the second point to obtain a first side of the triangle, and putting attributes of the first side into an array;
    (b4) acquiring a third point of the triangle according to a preset maximum side length, constructing the triangle utilizing the first point, the second point and the third point, and putting attributes of the other two sides of the triangle into the array;
    (b5) performing a circumscribed sphere judgment and an obtuse angle judgment on the triangle including the first side to find a fourth point to construct a new triangle with the first side;
    (b6) putting attributes of sides of the new triangle constructed by the fourth point and the first side into the array;
    (b7) selecting the attribute of a new side in the array sequentially, regarding the new side as a first side, and repeating the blocks (b5) and (b6); and
    (b8) outputting the triangle mesh surface constructed by all the triangles of the point cloud of the reference image.

3. The method according to claim 1, wherein block (c) further comprises:
    (c1) determining triangles that surround a point to be judged and determining points of the triangles;
    (c2) counting the number of triangles that connect to each of the determined points;
    (c3) determining if each count is greater than one;
    (c4) determining that the point to be judged is not a boundary point if each count is greater than one, or determining that the point to be judged is the boundary point of the measured image if any count is less than or equal to one; and
    (c5) repeating blocks (c1) to (c4) for each point in the triangle mesh surface, and outputting the boundary points if all the points in the triangle mesh surface have been judged.

4. The method according to claim 1, wherein block (d) further comprises:
    (d0) obtaining points of the triangles in the triangle mesh surface of the measured image;
    (d1) selecting a point to be judged of the triangles in the triangle mesh surface;
    (d2) obtaining a cubical figure that confines the point to be judged;
    (d3) determining if the cubical figure is null, and the procedure going to block (d4) if the cubical figure is not null, or the procedure going to block (d7) if the cubical figure is null;
    (d4) obtaining an average vector of points in the cubical figure;
    (d5) calculating an angle between a vector of the point to be judged and the average vector;
    (d6) determining if the angle is in a preset range, and the procedure going to block (d7) if the angle is in the preset range, or the procedure going to block (d8) if the angle is not in the preset range;
    (d7) determining that the point to be judged is an outline point, and the procedure going to block (d8);
    (d8) determining if all the points in the triangle mesh surface have been judged, and the procedure going to block (d1) if any of the points has not been judged, or the procedure going to block (d9) if all the points have been judged; and
    (d9) outputting the outline points.

5. The method according to claim 1, wherein block (e) further comprises:
- (e0) obtaining points of the triangles in the triangle mesh surface of the reference image;
- (e1) putting the boundary points and the outline points of the measured image in a first array;
- (e2) selecting a point to be judged from the first array sequentially;
- (e3) obtaining triangles that connect to the point to be judged, and adding points of the triangles in the first array;
- (e4) obtaining triangles on the joint portion of the reference image, wherein a width of the joint portion of the reference image is a preset number;
- (e5) determining if a triangle on the joint portion is obtained in block (e4), and the procedure going to block (e6) if a triangle on the joint portion is obtained in block (e4), or the procedure going to block (e7) if no triangle on the joint portion is obtained in block (e4);
- (e6) adding the obtained triangles in a second array, and adding the point to be judged in a third array;
- (e7) determining if all the points in the first array have been judged, and the procedure going to block (e2) if any of the points in the first array has not been judged, or the procedure going to block (e8) if all the points in the first array have been judged; and
- (e8) outputting data in the second array and the third array, wherein the obtained triangles stored in the second array are regarded as the triangles on the joint portion of the reference image, and the points stored in the third array are regarded as the measured points on the corresponding joint portion of the measured image.

6. The method according to claim 5, wherein block (e4) comprises:
- (h0) finding each point whose distance to the point to be judged is less than or equal to a preset value;
- (h1) determining if such a point is found, and the procedure going to block (e5) if no point is found, or the procedure going to block (h2) if such a point is found;
- (h2) selecting a point from the found points sequentially;
- (h3) determining if an angle between a vector of the selected point and a vector of the point to be judged is greater than 90 degrees, and the procedure going to block (h4) if the angle is greater than 90 degrees, or the procedure going to block (h2) if the angle is less than or equal to 90 degrees;
- (h4) obtaining triangles surrounding the selected point, wherein the obtained triangles are regarded as the triangles on the joint portion of the reference image;
- (h5) determining if all the found points in block (h0) have been judged, and the procedure going to block (h6) if all the found points have been judged, or the procedure returning to block (h2) if any of the found points has not been judged; and
- (h6) outputting the obtained triangles in block (h4), wherein the obtained triangles are regarded as the triangles on the joint portion of the reference image.

7. The method according to claim 5, wherein block (f) comprises:
- (f0) obtaining the triangles and the measured points to be compared;
- (f1) finding a point of the triangles nearest to each of the measured points;
- (f2) selecting a point to be compared from the measured points;
- (f3) obtaining a nearest point of the point to be compared, and obtaining triangles surrounding the nearest point;
- (f4) finding a triangle nearest to the point to be compared from the surrounding triangles in block (f3), and calculating a distance from the point to be compared to the nearest triangle, wherein the distance is regarded as one of the gap values of the joint portion of the reference image and the measured image;
- (f5) determining a range including a value of the distance, and obtaining a preset color of the range;
- (f6) setting the nearest triangle as the preset color;
- (f7) determining if all the measured points have been compared, and the procedure going to block (g) if all the measured points have been compared, or the procedure returning to block (f2) if any of the measured points has not been compared.

8. The method according to claim 7, wherein calculating a distance from the point to be compared to the nearest triangle further comprises:
- if a projection of the point to be compared is positioned inside the nearest triangle, the distance from the point to be compared to the nearest triangle equals a distance between the projection and the point to be compared; or
- if the projection of the point to be compared is positioned outside the nearest triangle, the distance from the point to be compared to the nearest triangle equals a minimum distance from the point to be compare to the three sides of the nearest triangle.

9. A storage medium having stored thereon instructions that, when executed by a processor of a computer, causes the processor to perform a method for measuring gaps between two parts of an object, the method comprising:
- (a) selecting two images of the two parts that are jointed in the object, and merging the two images to form an image of the object, wherein one of the two images is regarded as a reference image, and the other image is regarded as a measured image;
- (b) gridding the reference image and the measured image to obtain triangle mesh surfaces of the reference image and the measured image;
- (c) obtaining boundary points of the measured image;
- (d) obtaining outline points of the measured image;
- (e) obtaining triangles on a joint portion of the reference image and measured points on a corresponding joint portion of the measured image based on the boundary points and the outline points of the measured image;
- (f) comparing each measured point with an obtained triangle to obtain gap values of the joint portion between the reference image and the measured image, wherein the gap values of the joint portion between the reference image and the measured image are regarded as the gap values of the joint portion between the two parts of the object; and
- (g) outputting an analysis report of the gap values on a display device.

10. The storage medium according to claim 9, wherein block (c) further comprises:
- (c1) determining triangles that surround a point to be judged and determining points of the triangles;
- (c2) counting the number of triangles that connect to each of the determined points;
- (c3) determining if each count is greater than one;
- (c4) determining that the point to be judged is not a boundary point if each count is greater than one, or determining that the point to be judged is the boundary point of the measured image if any count is less than or equal to one; and (c5) repeating block (c1) to block (c4) for each point in the triangle mesh surface, and outputting the boundary points if all the points in the triangle mesh surface have been judged.

11. The storage medium according to claim 9, wherein block (d) comprises:
- (d0) obtaining points of the triangles in the triangle mesh surface of the measured image;
- (d1) selecting a point to be judged of the triangles in the triangle mesh surface;
- (d2) obtaining a cubical figure that confines the point to be judged;
- (d3) determining if the cubical figure is null, and the procedure going to block (d4) if the cubical figure is not null, or the procedure going to block (d7) if the cubical figure is null;
- (d4) obtaining an average vector of points in the cubical figure;
- (d5) calculating an angle between a vector of the point to be judged and the average vector;
- (d6) determining if the angle is in a preset range, and the procedure going to block (d7) if the angle is in the preset range, or the procedure going to block (d8) if the angle is not in the preset range;
- (d7) determining that the point to be judged is an outline point, and the procedure going to block (d8);
- (d8) determining if all the points in the triangle mesh surface have been judged, and the procedure going to block (d1) if any of the points has not been judged, or the procedure going to block (d9) if all the points have been judged; and
- (d9) outputting the outline points.

12. The storage medium according to claim 9, wherein the medium is selected from the group consisting of a hard disk drive, a compact disc, a digital video disc, and a tape drive.

13. A computing system for measuring gaps between two parts of an object, comprising:
- a processor to execute computerized instructions to implement one or more operations of a computer;
- a storage device for storing point cloud data of an object;
- a selecting module operable to select two images of the two parts that are jointed in the object, and merge the two images to form an image of the object, wherein one of the two images is regarded as a reference image, and the other image is regarded as a measured image;
- a gridding module operable to grid the reference image and the measured image to obtain triangle mesh surfaces of the reference image and the measured image;
- a first obtaining module operable to obtain boundary points of the measured image;
- a second obtaining module operable to obtain outline points of the measured image;
- a third obtaining module operable to obtain triangles on a joint portion of the reference image and measured points on a corresponding joint portion of the measured image based on the boundary points and the outline points of the measured image;
- a comparing module operable to compare each measured point with an obtained triangle to obtain gap values of the joint portion between the reference image and the measured image, wherein the gap values of the joint portion between the reference image and the measured image are regarded as the gap values of the joint portion between the two parts of the object; and
- the comparing module further operable to output an analysis report of the gap values on a display device.

14. The system according to claim 13, wherein the gridding module grids the reference image by:
- determining a cubical figure that confines a point cloud of the reference image, mapping a grid on the cubical figure to obtain a plurality of grid squares, and putting an identification (ID) of each point of the point cloud into a corresponding grid square;
- determining a first point of a triangle in the point cloud, obtaining grid squares surrounding the first point, and acquiring a second point of the triangle nearest to the first point in the grid squares surrounding the first point;
- connecting the first point with the second point to obtain a first side of the triangle, and putting attributes of the first side into an array;
- acquiring a third point of the triangle according to a preset maximum side length, constructing the triangle utilizing the first point, the second point and the third point, and putting attributes of the other two sides of the triangle into the array;
- performing a circumscribed sphere judgment and an obtuse angle judgment on the triangle including the first side to find a fourth point to construct a new triangle with the first side;
- putting attributes of sides of the new triangle constructed by the fourth point and the first side into the array;
- selecting the attribute of a new side in the array sequentially, regarding the new side as a first side, and repeating the performing block and the putting block; and
- outputting the triangle mesh surface constructed by all the triangles of the point cloud of the reference image.

15. The system according to claim 13, wherein the first obtaining module obtains boundary points of the measured image by:
- determining triangles that surround a point to be judged and determining points of the triangles;
- counting the number of triangles that connects to each of the determined points;
- determining if each count is greater than one;
- determining that the point to be judged is not a boundary point if each count is greater than one, or determining that the point to be judged is the boundary point of the measured image if any count is less than or equal to one; and
- outputting the boundary points if all the points in the triangle mesh surface have been judged.

16. The system according to claim 13, wherein the second obtaining module obtains outline points of the measured image by:
- obtaining points of the triangles in the triangle mesh surface of the measured image;
- selecting a point to be judged of the triangles in the triangle mesh surface;
- obtaining a cubical figure that confines the point to be judged;
- if the cubical figure is not null, obtaining an average vector of points in the cubical figure, and calculating an angle between a vector of the point to be judged and the average vector;
- if the angle is in a preset range, determining that the point to be judged is an outline point;
- if the angle is not in the preset range, selecting a new point to be judged of the triangles in the triangle mesh surface;
- if the cubical figure is null, determining that the point to be judged is the outline point; and
- if all the points in the triangle mesh surface of the measured image have been judged, outputting the outline points.

17. The system according to claim 13, wherein the third obtaining module obtains triangles on a joint portion of the reference image and measured points on a corresponding joint portion of the measured image by:
- obtaining points of the triangles in the triangle mesh surface of the reference image;
- putting the boundary points and the outline points of the measured image in a first array;
- selecting a point to be judged from the first array sequentially;
- obtaining triangles that connect to the point to be judged, and adding points of the triangles in the first array;
- obtaining triangles on the joint portion of the reference image, wherein a width of the joint portion of the reference image is a preset number;
- if a triangle on the joint portion is obtained, adding the obtained triangles in a second array, and adding the point to be judged in a third array;
- if no triangle on the joint portion is obtained, selecting a new point to be judged from the first array sequentially;
- if all the points in the first array have been judged, outputting data in the second array and the third array, wherein the obtained triangles stored in the second array are regarded as the triangles on the joint portion of the reference image, and the points stored in the third array are regarded as the measured points on the corresponding joint portion of the measured image.

18. The system according to claim 17, wherein the third obtaining module obtains triangles on a joint portion of the reference image by:
- finding each point whose distance to the point to be judged is less than or equal to a preset value;
- selecting a point from the found points sequentially;
- determining if an angle between a vector of the selected point and a vector of the point to be judged is greater than 90 degrees;
- if the angle is greater than 90 degrees, obtaining triangles surrounding the selected point, wherein the obtained triangles are regarded as the triangles on the joint portion of the reference image;
- if the angle is less than or equal to 90 degrees, selecting a new point of the found points sequentially;
- if all the found points have been judged, outputting the obtained triangles, wherein the obtained triangles are regarded as the triangles on the joint portion of the reference image; and
- if any of the found points has not been judged, selecting a new point of the found points sequentially.

19. The system according to claim 17, wherein the comparing module compares each measured point with an obtained triangle to obtain gap values of a joint portion of the reference image and the measured image by:
- obtaining the triangles and the measured points to be compared;
- finding a point of the triangles nearest to each of the measured points;
- selecting a point to be compared from the measured points;
- obtaining a nearest point of the point to be compared, and obtaining triangles surrounding the nearest point;
- finding a triangle nearest to the point to be compared from the surrounding triangles, and calculating a distance from the point to be compared to the nearest triangle, wherein the distance is regarded as one of the gap values of the joint portion of the reference image and the measured image;
- determining a range including a value of the distance, and obtaining a preset color of the range;
- setting the nearest triangle as the preset color;
- if any of the measured points has not been compared, selecting a new point to be compared from the measured points.

20. The system according to claim 19, wherein the comparing module calculates a distance from the point to be compared to the nearest triangle by:
- if a projection of the point to be compared is positioned inside the nearest triangle, the distance from the point to be compared to the nearest triangle equals a distance between the projection and the point to be compared; or
- if the projection of the point to be compared is positioned outside the nearest triangle, the distance from the point to be compared to the nearest triangle equals a minimum distance from the point to be compared to the three sides of the nearest triangle.

* * * * *